3,323,987
FUNGICIDAL PREPARATIONS CONTAINING COPPER-BIS-VALERIANATE
Heinz Frensch, Frankfurt am Main, Germany, assignor to Farbwerke Hoechst Aktiengesellschaft vormals Meister Lucius & Brüning, Frankfurt am Main, Germany, a corporation of Germany
No Drawing. Filed July 7, 1965, Ser. No. 470,197
Claims priority, application Germany, July 18, 1964, F 43,490
2 Claims. (Cl. 167—22)

The present invention relates to fungicidal plant protective agents.

In practice copper salts that are difficult to dissolve in water have been used for controlling various kinds of fungi, especially on plants. In general, so-called Bordeaux mixtures and copper oxychloride have been used.

The aforesaid copper compounds have a certain phytotoxicity. Moreover, in many cases a so-called "copper shock" is observed which results in a depression of growth of the plants treated. Attempts have, therefore, been made to find other fungicides to replace the said copper compounds. In some fields of application, organic fungicides, for example zinc- or manganese-ethylene-bis-dithiocarbamate or trichloromethyl-thio-tetra-hydrophthalimide (Captan), have partially replaced the copper compounds. It has been found, however, that the copper compounds cannot be entirely dispensed with, particularly if there is a greater danger of infestation.

Now I have found that the aforesaid disadvantages of copper-containing compounds can be avoided by using fungicidal preparations that contain as an active substance copper-bis-valerianate in the usual preparations, for example as a so-called "wettable powder," if desired in admixture with other known pesticides and/or fertilizers.

Copper-bis-valerinate $(C_4H_9COO-)_2Cu$, a compound known for example from "Beilstein," E II, volume 2, page 265, which can be prepared by causing valerianic acid to act upon freshly precipitated $Cu(OH)_2$ in aqueous suspension, has an excellent plant tolerability and simultaneously a strong fungicidal action. It is surprising that the effectiveness of the compound is not directly proportional to its copper content and that the fungitoxicity of the compound is clearly higher than would correspond to the copper content.

The compound, which may be used in the usual pesticidal formulations, may also be used in admixture with other fungicides, insecticides, acaricides, nematocides or fertilizers.

The fungicidal preparations of the inventon are prepared by mixing copper-bis-valerianate with inert adjuvants such as wetting agents, dispersing agents or adhesives commonly used for fungicidal formulations and/or other pesticides and fertilizers.

The following examples serve to illustrate the invention but they are not intended to limit it thereto:

*Example 1*

Vine plants (type "Silvaner") which had been grown in pots were treated in the four-leaves stage with a suspension in water of a so-called "wettable powder" consisting of 50% copper-bis-valerianate as the active substance,
38% of precipitated silicic acid as an adsorption agent and grinding auxiliary,
10% of dry sulfite cellulose waste liquor as a dispersing agent and adhesive,
2% of oleyl methyl tauride as a wetting agent.

As a reference preparation there was used a commercial copper wettable powder of copper oxychloride having 50% of metallic copper in the preparation. The concentrations used were 250, 125, 60 and 30 milligrams, respectively, per liter of spray liquor.

After drying of the spray, the plants were strongly infested with a thick suspension of zoospores of *Peronospora viticola*. The infested plants were placed, as usual, for 8 hours into a moist chamber at 20° to 23° C. After an incubation period of 7 days, the infestation with Peronospora was examined with reference to untreated, infested plants.

As can be seen from the test results of Table I hereunder, the compound of the invention has a substantially higher action on Peronospora than the standard reference preparation on the basis of copper oxychloride.

TABLE I.—COMPARISON EXPERIMENT ON VINE PLANTS WITH PERONOSPORA

| Preparation on the basis— | Percent of infestation with Peronospora when using the active substance in the following concentrations (mg./l. of spray liquor) | | | |
|---|---|---|---|---|
| | 250 mg./l. | 125 mg./l. | 60 mg./l. | 30 mg./l. |
| Copper-bis-valerianate | 1.7 | 9.1 | 20 | 53 |
| Copper oxychloride | 27 | 42 | 86 | 100 |
| Untreated | 100 | 100 | 100 | 100 |

*Example 2*

To test the permanent action of the copper salt of valerianic acid (copper-bis-valerianate), vine plants in the four-leaves stage were treated with a suspension in water of a wettable powder consisting of 25% of copper-bis-valerianate as the active substance,
64% of precipitated silicic acid as an adsorption agent and grinding auxiliary,
10% of dry sulfite cellulose waste liquor as a dispersing agent and adhesive,
1% of oleyl methyl tauride as a wetting agent.

The concentrations used were 550, 250, 125, 60, 30 and 15 milligrams, respectively per liter of spray liquor. After this treatment the plants were brought into the greenhouse. After a period of 4 weeks, the plants were strongly infested with a thick suspension of zoospores of *Peronospora viticola* and placed in a moist chamber for 8 hours. After an incubation period of 7 days which is usual in the case of Peronospora the infestation with Peronospora was examined with reference to untreated vine plants which were infested.

As shown in Table II, copper-bis-valerianate has a higher permanent action than the standard reference preparation on the basis of copper-oxychloride.

TABLE II.—COMPARISON EXPERIMENT ON VINE PLANTS WITH PERONOSPORA

| Preparation on the basis— | Percent of infestation with Peronospora when using the active substance in the following concentrations (mg./l. of spray liquor) | | | | | |
|---|---|---|---|---|---|---|
| | 500 mg./l. | 250 mg./l. | 125 mg./l. | 60 mg./l. | 30 mg./l. | 15 mg./l. |
| Copper-bis-valerianate | 0 | 0.1 | 0.6 | 3.4 | 8.6 | 27 |
| Copper oxychloride | 0.4 | 13 | 27 | 49 | 72 | 100 |
| Untreated | 100 | 100 | 100 | 100 | 100 | 100 |

*Example 3*

In a year with frequent occurrences of Peronospora infestation, hop growing in the fields was sprayed several times as a precaution with a 0.2% aqueous suspension of the composition as described in Example 1. The plants remained free from infestation.

I claim:
1. A fungicidal preparation which comprises as the active substance copper-bis-valerianate in a fungitoxically sufficient amount in a carrier therefor.
2. A fungicidal preparation according to claim 1 in the form of a wettable powder which contains copper-bis-valerianate as the fungitoxically active substance, and at least one member selected from the group consisting of wetting agents, dispersing agents, adhesive and inert adjuvants, said preparation containing said copper compound in a concentration from 15 mg. to 1000 mg. per liter of a spray liquor.

References Cited

UNITED STATES PATENTS 2,878,155   3/1959   Cruickshank _____ 167—22

OTHER REFERENCES

Beilstein, E II, vol. 2, p. 265 (1942).
De Ong, Chemistry and Uses of Pesticides, 2nd ed. (1956), pp. 43–44.
Frear, Chemistry of the Pesticides, 3rd ed. (1955), pp. 330–331.

ALBERT T. MEYERS, *Primary Examiner.*

S. ROSEN, *Examiner.*

SAMUEL J. FRIEDMAN, *Assistant Examiner.*